United States Patent [19]

Steiner

[11] Patent Number: 4,624,325

[45] Date of Patent: Nov. 25, 1986

[54] APPARATUS FOR DAMPENING THE RECOIL OF PERCUSSION TOOLS

[75] Inventor: Heinz Steiner, Dörflingen, Switzerland

[73] Assignee: SIG Schweizerische-Industrie Gesellschaft, Neuhausen am Rheinfall, Switzerland

[21] Appl. No.: 632,192

[22] Filed: Jul. 17, 1984

[30] Foreign Application Priority Data

Jul. 21, 1983 [CH] Switzerland ............... 4010/83

[51] Int. Cl.$^4$ ............................................. B25D 17/24
[52] U.S. Cl. ..................................... 173/139; 173/133; 173/134
[58] Field of Search ............... 173/132, 138, 133, 134, 173/139, 1, 2; 92/85 B

[56] References Cited

U.S. PATENT DOCUMENTS

| 4,068,727 | 1/1978 | Andersson et al. ............... 173/139 |
| 4,073,350 | 2/1978 | Eklof et al. ............... 173/134 |
| 4,308,926 | 1/1982 | Montabert ............... 173/162 R |
| 4,363,365 | 12/1982 | Nikolaev et al. ............... 173/139 |

FOREIGN PATENT DOCUMENTS

| 2654200 | 6/1977 | Fed. Rep. of Germany . |
| 398467 | 3/1966 | Switzerland . |
| 1328409 | 8/1973 | United Kingdom . |
| 169474 | 9/1965 | U.S.S.R. ............... 173/139 |

Primary Examiner—Donald R. Schran
Assistant Examiner—James L. Wolfe
Attorney, Agent, or Firm—Spencer & Frank

[57] ABSTRACT

A percussion tool comprising a housing; a tool bit movably supported by the housing for alternatingly executing forward and recoil strokes; a hammer piston supported in the housing and arranged for delivering consecutive blows at least indirectly to the tool bit for effecting the forward strokes thereof; a dampening chamber in the housing; an arrangement for introducing fluid into the dampening chamber for generating a dampening force therein; and a dampening piston supported in the housing and bounding the dampening chamber. The tool bit is connected with the dampening piston for effecting an axial displacement of the dampening piston into the dampening chamber by the tool bit during the recoil strokes thereof. There is further provided a control arrangement carried by the dampening piston for varying the dampening force of the fluid in the dampening chamber as function of a relative axial displacement between the dampening piston and the housing.

7 Claims, 5 Drawing Figures

APPARATUS FOR DAMPENING THE RECOIL OF PERCUSSION TOOLS

BACKGROUND OF THE INVENTION

This invention relates to apparatus for dampening the recoil of percussion tools of the type having a reciprocating tool bit insertable in a feeding sleeve attached to (or forming part of) a tool housing. A pressure medium intermittently actuates a hammer piston which delivers blows to the tool bit, while a tool feeding force is applied to the tool housing.

In conventional rock boring machines spring arrangements are provided for dampening the tool recoil. In this manner, the recoil is absorbed preponderantly by the feeding force and consequently, the operating person or the feed carriage (mount) has to absorb the impacts.

German Pat. No. 2,610,910 discloses a method according to which the tool feeding force and/or the pressure in the dampening chamber is set in relation to the magnitude of the recoil forces in such a manner that the dampening piston and the tool bit feeding sleeve do not, during reciprocation, abut the tool housing. The dampening chamber is continuously charged with the pressurized fluid with the interposition of a pressure setting arrangement.

The embodiment disclosed in the above-noted patent includes a feed sleeve for the boring tool. The sleeve has a hollow cylindrical extension in the zone of the piston rod which constitutes the hammer and an enlargement which constitutes a dampening piston and which is situated between an inner wall formed by a sleeve guiding the piston rod and an outer wall formed by the wall of the tool housing. In the dampening chamber defined in this manner, pressurized fluid is introduced with the intermediary of a settable reduction valve and a check valve.

By means of the above-outlined conventional arrangement an air cushion is formed between the feeding sleeve that takes up the recoil of the work tool and the tool housing. Each recoil effects a polytropic compression of the air cushion.

If the tool feed is applied by human force, the latter may vary between 0 and 80 kg and thus the pressure in the dampening chamber has to be adapted accordingly. Such an adaptation is not feasible with the above-described conventional system. Although that system includes a setting member, the latter, however, is not adapted to be set every time the pressure force changes. It is further apparent that for a satisfactory dampening effect the pressure in the dampening chamber has to be maintained at the lowest possible level which, however, should be sufficiently high to prevent the recoil from causing any contacting between the dampening piston and the tool housing.

SUMMARY OF THE INVENTION

It is an object of the invention to provide an improved apparatus of the above-outlined type in which the force applied to the dampening piston automatically sets itself to the magnitude of the tool feeding force.

These objects and others to become apparent as the specification progresses, are accomplished by the invention, according to which, briefly stated, in a dampening housing, by means of an axially movable dampening piston, a dampening chamber is defined and further, the dampening piston has means to vary the quantity and/or the pressure of the dampening medium in the dampening chamber as a function of a relative axial displacement between the dampening piston and the dampening housing.

DESCRIPTION OF THE PREFERRED EMBODIMENTS

Figure 1:
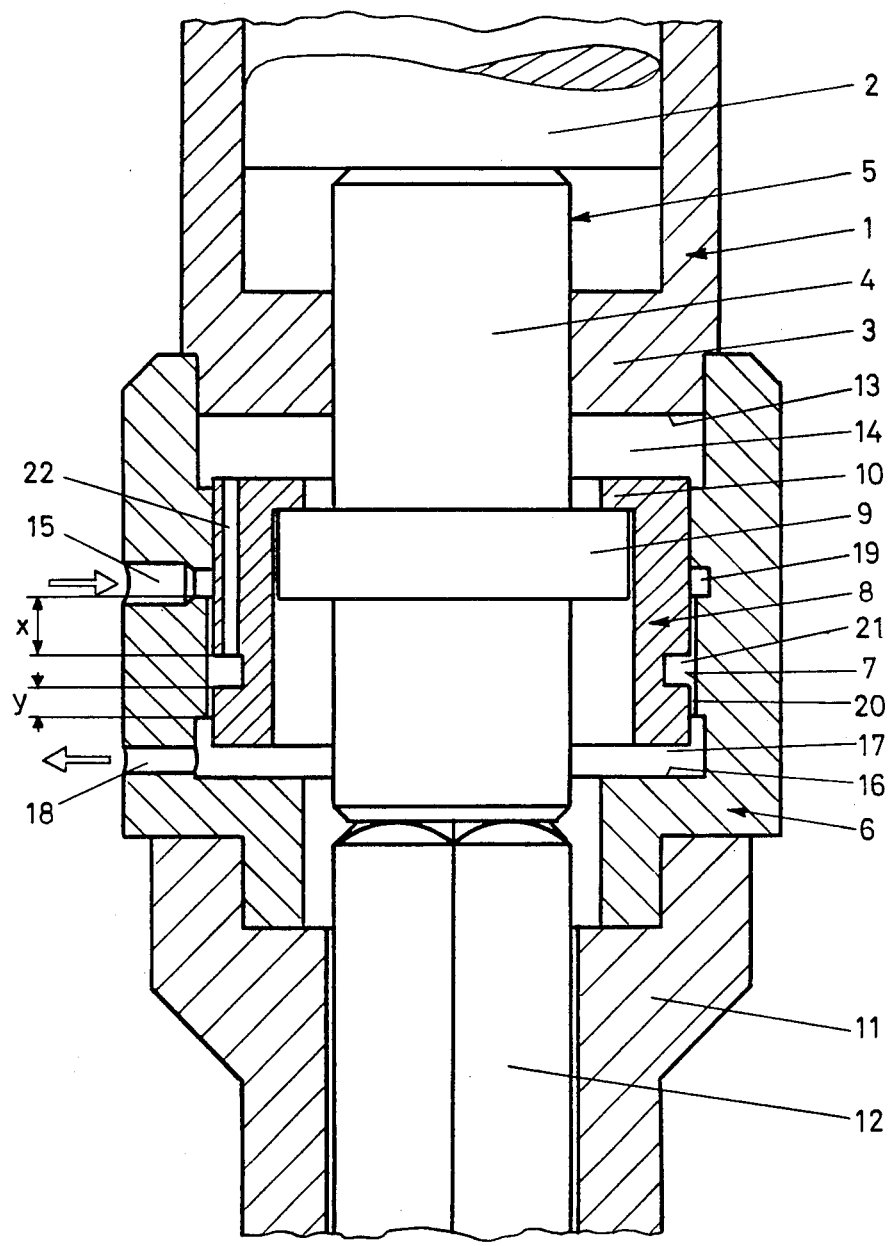
FIG. 1 is an axial sectional view of a preferred embodiment of the invention.

Turning now to FIG. 1, there is illustrated that portion of a percussion tool which includes the mechanism for transferring the impacting energy. The hammer mechanism proper has no bearing on the invention and may be of any conventional type such as disclosed, for example, in the earlier-noted German Pat. No. 2,610,990. Accordingly, of the impacting mechanism there is shown only the hammer piston 2 which reciprocates in a tool housing 1 which is closed off by a frontal transverse guide plate 3 through which passes a shank 4 of an anvil 5 whose upper radial end face cooperates with the hammer piston 2.

Underneath the tool housing 1 there is situated a dampening housing 6 which is affixed to the housing 1 in axial alignment therewith and which has cylindrical wall portions 7 guiding a hollow dampening piston 8. The shank 4 of the anvil 5 has a collar-like flange 9 situated within the dampening piston 8, while the latter is provided with a radially inwardly directed top shoulder 10 such that the latter overlaps an annular radial surface portion of the collar 9.

To the dampening housing 6 there is attached a work tool feed sleeve 11 into which extends, from below, the terminal shank portion 12 of a tool bit and contacts, with its upper radial end face, the lower radial face of the anvil shank 4.

Between the shoulder 10 of the dampening piston 8 and the underface 13 of the guide plate 3 there is defined a dampening chamber 14 which is comparable to that disclosed in the German Pat. No. 2,610,990.

The dampening housing 6 has a dampening medium inlet port 15 and further, between the dampening piston 8 and a radial bottom face 16 of the dampening housing 6 a chamber 17 is formed which communicates with the environment by means of a port 18 provided in the dampening housing 6.

The port 15 opens into an upper annular groove 19 provided in the cylindrical housing bore 7. Above the annular groove 19 the housing bore 7 serves as a guide face for the axially movably dampening piston 8 while at its lower part, it has a slightly enlarged diameter to be thus spaced by an annular air gap from the dampening piston 8 for serving as a throttling gap 20 to affect the flow rate of the fluid passing therethrough.

In the outer wall of the dampening piston 8, in the zone of the throttling gap 20, an annular groove 21 is provided. A bore 22 extending axially parallel in the dampening piston 8 forms a coupling channel between the annular groove 21 and the dampening chamber 14.

The throttling gap 20 is composed of consecutive axial lengths x and y separated by the axial width of the annular groove 21 provided in the dampening piston 8. The throttle length x thus extends from the annular groove 19 to the annular groove 21 while the throttle length y extends from the annular groove 21 to the outlet chamber 17. As it will be described below, x and y vary as the feeding force changes.

In the description which follows, the operation of the above-described arrangement will be set forth.

Upon recoil, that is, upon upward motion of the tool bit 12, the anvil shank 4, by virtue of the anvil flange 9, carries with it the dampening piston 8. The air cushion in the dampening chamber 14, however, prevents the dampening piston 8 from hitting the underface 13 of the guide plate 3.

If now the feeding force on the percussion tool is increased, the axial gap length x (inlet throttle) between the annular groove 19 and the annular groove 21 decreases, while the axial gap length y (outlet throttle) between the annular groove 21 and the chamber 17 increases. Thus, the effect of the inlet throttle is reduced, while that of the outlet throttle is increased. In this manner, the pressure in the lower annular groove 21 is increased and as a result, the pressure also increases in the dampening chamber 14 so that even in case of a larger feeding force, the dampening piston 8 cannot hit the lower face 13 of the guide plate 3.

Figure 2:
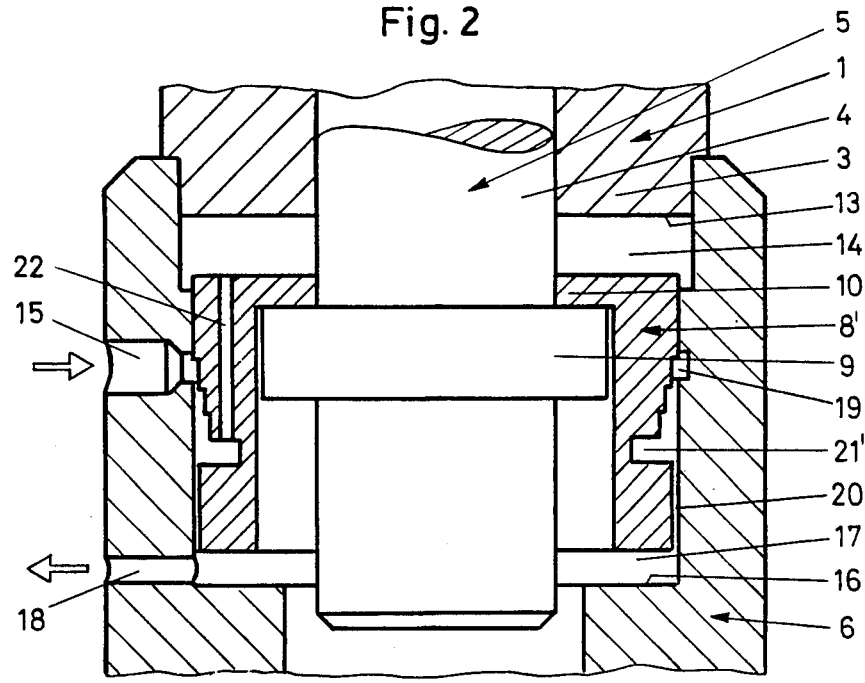
FIG. 2 is an axial sectional view of another preferred embodiment of the invention.

Turning now to the embodiment illustrated in FIG. 2, the annular groove 21' about the circumference of the dampening piston 8' has, in a direction towards the groove 19, a stepped configuration, as a result of which the quantities of the dampening pressurized fluid (such as air) admitted to the dampening chamber 14 are varied stepwise, that is, in definite increments. It is to be understood that instead of a stepped configuration of the outer face of the dampening piston 8' a curved configuration or any other arrangement of control edges is feasible to achieve the desired flow rate control.

Figure 3:
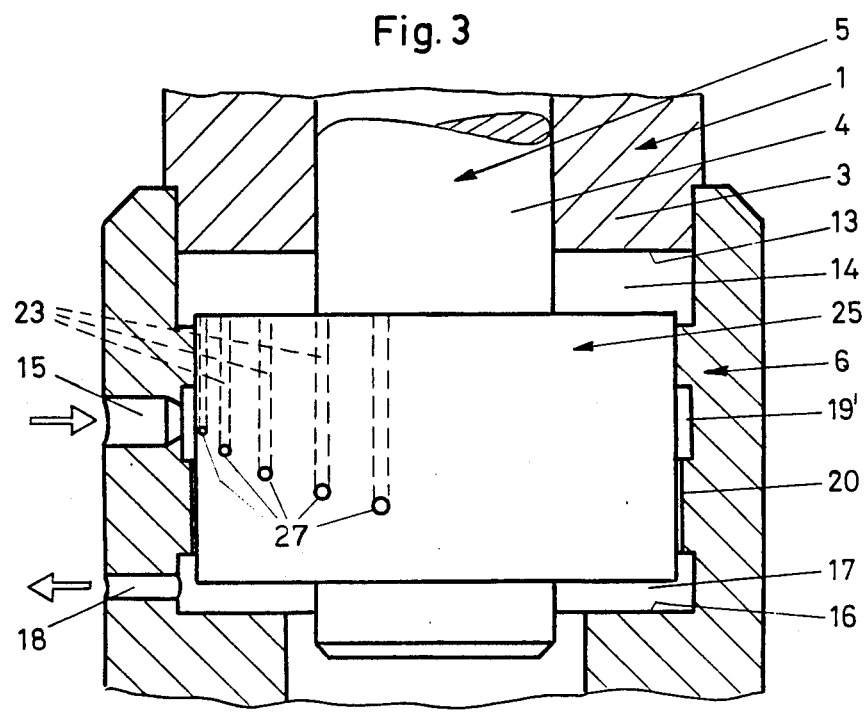
FIG. 3 is an axial sectional view of still another preferred embodiment of the invention.

Turning now to the embodiment illustrated in FIG. 3, there is provided a dampening piston 25 which is affixed to the anvil shank 4. The dampening piston 25 is provided with a plurality of axial channels 23 which are of unlike diameters and which terminate, at one end, on the outer cylinder face of the dampening piston 25 by means of respective radial ports 27, and on the upper radial face of the dampening piston, at the other end, to communicate with the dampening chamber 14. For each channel 23 the associated radial port 27 is at a different axial location on the outer face of the dampening piston 25. In this manner, dependent upon the axial position of the dampening piston 25 with respect to the housing 6, selected ones of channels 23 will be brought into alignment with the annular groove 19' which continuously communicates with the inlet port 15.

Figure 4:
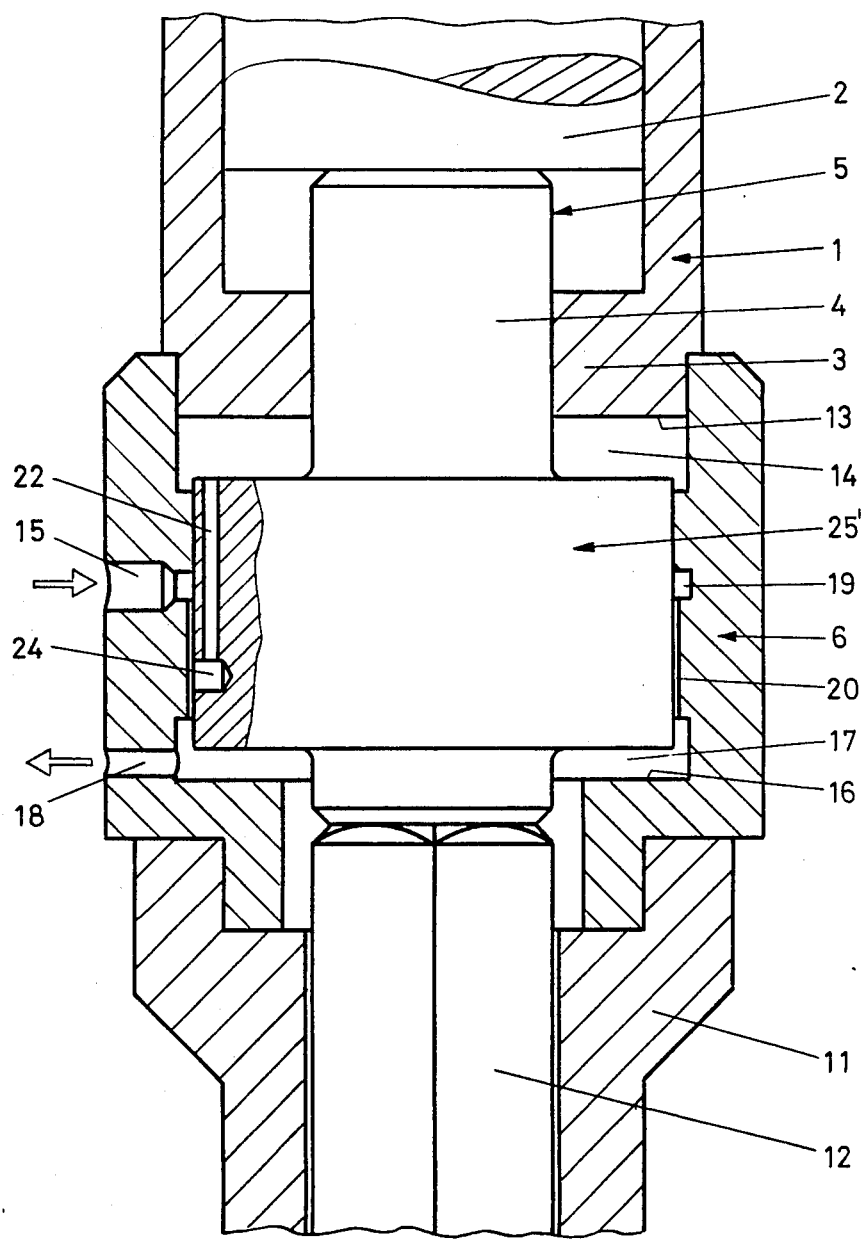
FIG. 4 axial sectional view of still another preferred embodiment of the invention.

The embodiment shown in FIG. 4 is similar to that of FIG. 1 with the exception that the dampening piston 25' is, unlike in the FIG. 1 embodiment, directly affixed to the anvil shank 4, similarly to the embodiment of FIG. 3. The axial channel 22 communicates with the inlet groove 19 through the throttle gap 20 by means of a radial port 24. It will be understood that the annular inlet groove 19 too, could conceivably be replaced by a radial port with appropriate adjustment of the lower opening.

Figure 5:
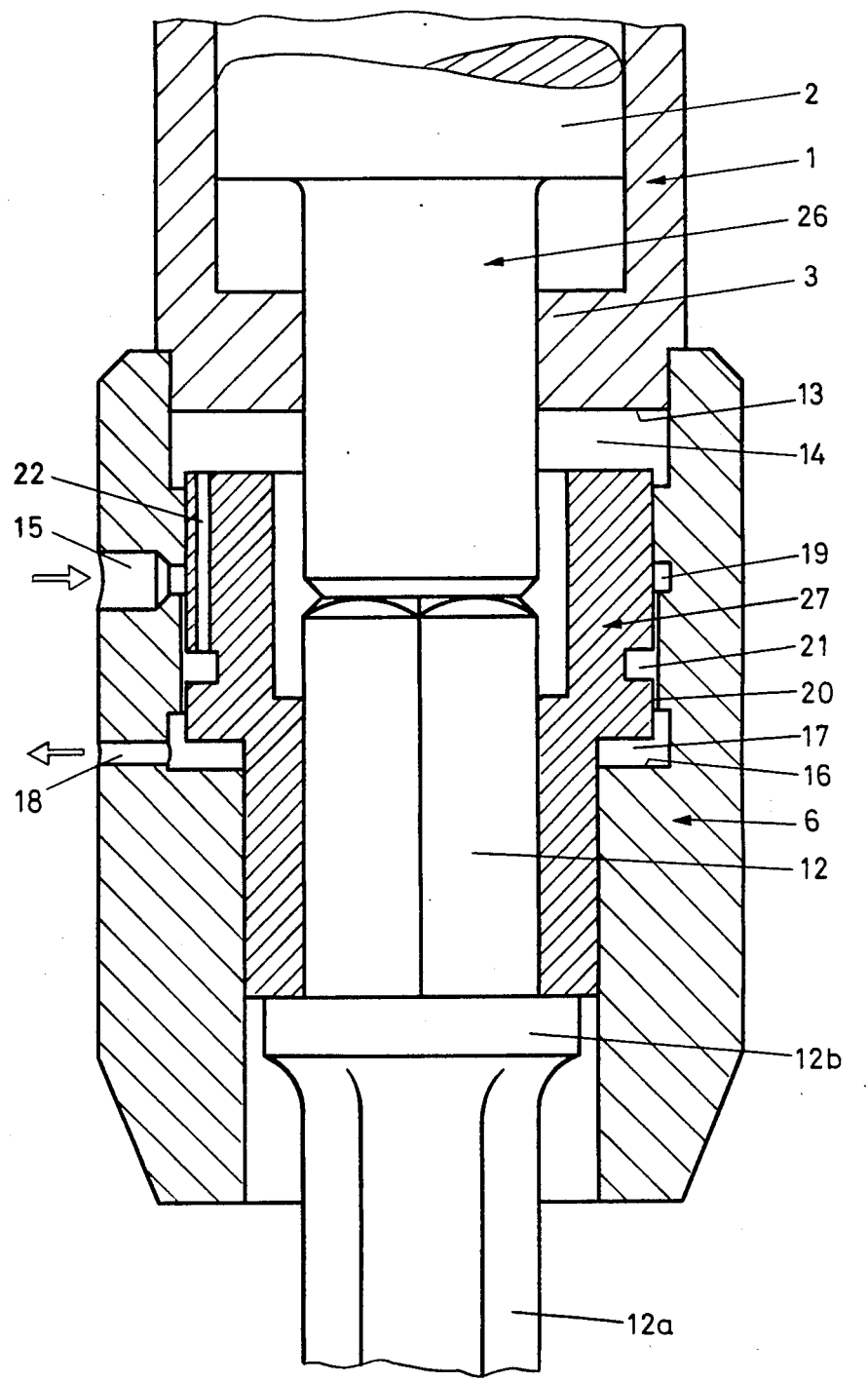
FIG. 5 is an axial sectional view of a further preferred embodiment of the invention.

Turning now to FIG. 5, the embodiment illustrated therein is similar to FIG. 1, except that a separate anvil is dispensed with. In this embodiment the hammer piston 2' continues in a piston rod 26 whose terminal radial face constitutes the hammer face to directly deliver blows to the shank 12 of a tool bit 12a. A collar 12b of the tool bit is adapted to abut a lower radial terminal edge of the dampening piston 27. The latter is, in its upper zone, structured similarly to the dampening piston 8 of the FIG. 1 embodiment, except that it is void of an inwardly directed radial shoulder. The recoil force of the tool is thus transmitted by the tool bit 12a directly to the dampening piston 27 which operates identically to the dampening piston 8 of the FIG. 1 embodiment.

It is to be noted that it is feasible to switch the inlet and outlet connections 15 and 18 with one another; in which case then the control edges should be accordingly changed.

It will be understood that the above description of the present invention is susceptible to various modifications, changes and adaptations, and the same are intended to be comprehended within the meaning and range of equivalents of the appended claims.

What is claimed is:

1. A percussion tool comprising
   (a) a housing;
   (b) a tool bit movably supported by the housing for alternatingly executing forward and recoil strokes;
   (c) a hammer piston supported in the housing and arranged for delivering consecutive blows at least indirectly to the tool bit for effecting the forward strokes thereof;
   (d) means defining a dampening chamber in the housing;
   (e) means for introducing fluid into said dampening chamber for generating a dampening effect therein;
   (f) a dampening piston supported in said housing and bounding said dampening chamber; said dampening piston being arranged for reciprocating motion into and out of said dampening chamber;
   (g) means connecting said tool bit with said dampening piston for effecting an axial displacement of said dampening piston into said dampening chamber by said tool bit during the recoil strokes thereof;
   (h) control means carried by said dampening piston for varying the dampening effect of the fluid in said dampening chamber as a function of a relative axial displacement between said dampening piston and said housing;
   (i) a first cylindrical portion of said housing being in a sliding engagement with said dampening piston;
   (j) a second cylindrical portion of said housing defining, with outer surface portions of said dampening piston, a throttle gap having an axial length parallel to the reciprocating motion of said dampening piston; said throttle gap having an inlet throttle length portion and a discharge throttle length portion;
   (k) axially spaced inlet and outlet ports provided in said housing for introducing and, respectively, discharging the fluid; said throttle gap maintaining fluid communication between said ports; and
   (l) channel means provided in said dampening piston; said channel means having a first opening communicating with said dampening chamber and a second opening situated on an outer lateral surface of said dampening piston between said ports and communicating with said throttle gap; said second opening dividing said throttle gap into said inlet throttle length portion extending from said second opening toward said inlet port, and into said discharge throttle length portion extending from said second opening towards said outlet port; the length of said throttle length portions varying in opposite sense upon relative axial displacement between said dampening piston and said housing; said throttle length portions forming part of said control means.

2. A percussion tool as defined in claim 1, wherein said second opening is formed by an annular circumferential groove in said dampening piston.

3. A percussion tool as defined in claim 1, wherein said second opening is formed by a radial port extending into said dampening piston.

4. A percussion tool comprising
   (a) a housing;
   (b) a tool bit movably supported by the housing for alternatingly executing forward and recoil strokes;
   (c) a hammer piston supported in the housing and arranged for delivering consecutive blows at least indirectly to the tool bit for effecting the forward strokes thereof;
   (d) means defining a dampening chamber in the housing;
   (e) means for introducing fluid into said dampening chamber for generating a dampening effect therein;
   (f) a dampening piston supported in said housing and bounding said dampening chamber; said dampening piston being arranged for reciprocating motion into and out of said dampening chamber;
   (g) means connecting said tool bit with said dampening piston for effecting an axial displacement of said dampening piston into said dampening chamber by said tool bit during the recoil strokes thereof;
   (h) control means carried by said dampening piston for varying the dampening effect of the fluid in said dampening chamber as a function of a relative axial displacement between said dampening piston and said housing;
   (i) a port provided in said housing for passing the fluid therethrough;
   (j) a circumferential groove provided in said dampening piston; said groove having a multiply-stepped depth; different depths of said groove being in alignment with said port dependent on a relative axial position between said dampening piston and said housing; said circumferential groove forming part of said control means; and
   (k) channel means extending in said dampening piston and maintaining communication between said groove and said dampening chamber.

5. A percussion tool as defined in claim 4, wherein said port is an inlet port for introducing the fluid into said housing.

6. A percussion tool comprising
   (a) a housing;
   (b) a tool bit movably supported by the housing for alternatingly executing forward and recoil strokes;
   (c) a hammer piston supported in the housing and arranged for delivering consecutive blows at least indirectly to the tool bit for effecting the forward strokes thereof;
   (d) means defining a dampening chamber in the housing;
   (e) means for introducing fluid into said dampening chamber for generating a dampening effect therein;
   (f) a dampening piston supported in said housing and bounding said dampening chamber; said dampening piston being arranged for reciprocating motion into and out of said dampening chamber;
   (g) means connecting said tool bit with said dampening piston for effecting an axial displacement of said dampening piston into said dampening chamber by said tool bit during the recoil strokes thereof;
   (h) control means carried by said dampening piston for varying the dampening effect of the fluid in said dampening chamber as function of a relative axial displacement between said dampening piston and said housing;
   (i) a port provided in said housing for passing the fluid therethrough; and
   (j) a plurality of channels of different cross-sectional areas; each said channel having a first opening merging into said dampening chamber and a second opening on an outer lateral surface of said dampening piston; the second openings being at different axial locations of said dampening piston, whereby different said second openings being aligned with said port dependent upon the relative axial position between said dampening piston and said housing; said channels forming part of said control means.

7. A percussion tool as defined in claim 6, wherein said port is an inlet port for introducing the fluid into said housing.

* * * * *